United States Patent [19]

Sutter, Jr.

[11] Patent Number: 4,618,961
[45] Date of Patent: * Oct. 21, 1986

[54] CONFIGURATION OF ELECTRODES FOR TRANSVERSELY EXCITED GAS LASERS

[76] Inventor: Leroy V. Sutter, Jr., 6301 Summertime La., Culver City, Calif. 90230

[*] Notice: The portion of the term of this patent subsequent to Jun. 19, 2001 has been disclaimed.

[21] Appl. No.: 450,195
[22] Filed: Dec. 16, 1982
[51] Int. Cl.⁴ .............................................. H01S 3/097
[52] U.S. Cl. ....................................... 372/87; 372/83; 372/82
[58] Field of Search ..................... 372/87, 88, 83, 82

[56] References Cited

U.S. PATENT DOCUMENTS

| 3,427,567 | 2/1969 | Bridges et al. | 372/87 |
| 3,725,735 | 4/1973 | Beaulieu et al. | 372/87 |
| 4,370,598 | 1/1983 | Krahn | 372/87 |
| 4,455,658 | 6/1984 | Sutter, Jr. | 372/82 |

Primary Examiner—Léon Scott, Jr.
Attorney, Agent, or Firm—W. Edward Johansen

[57] ABSTRACT

The present invention is a configuration of electrodes in a transversely excited gas laser which includes an elongated cylindrical chamber with a laser gas confined therein, a pair of reflectors which reflect light energy from a discharge of the laser gas within the chamber so that the light energy travels longitudinally the length thereof, an rf generator which applies a voltage of alternating polarity between the electrodes at a frequency ranging from 10 Mhz to about 3 GHz to establish the laser gas discharge, a coupling circuit which matches the steady state reactive impedance of the chamber to the impedance of the rf generator and couples the rf generator to the electrodes. The configuration of the electrodes, each of which is formed from an electrically conductive material and is in the shape of a continuous helix, includes a first electrode and a second electrode each of which is disposed opposite to the other on the outer surface of the chamber in a first plane. The configuration of electrodes also includes a third electrode and a fourth electrode each of which is disposed opposite to the other on the outer surface of the chamber in a second plane which is orthogonal to the first plane. The phase correlation of the configuration of electrodes is such that the first electrode is in phase with the second electrode, the third electrode is in phase with the fourth electrode and the first electrode is 180° out of phase with the third electrode.

11 Claims, 7 Drawing Figures

CONFIGURATION OF ELECTRODES FOR TRANSVERSELY EXCITED GAS LASERS

BACKGROUND OF THE INVENTION

1. Field of the Invention

The present invention relates to a laser bore and electrode structure of a transverse excited gas laser for generating $TE_{0q}*$ Laguerre-Gaussian modes and more particularly to an electrode configuration for use in combination with an elongated cylindrical chamber of the laser bore and electrode structure for providing an azimuthally uniform discharge.

2. Description of the Prior Art

U.S. Pat. No. 4,352,188, entitled RF Pumped Waveguide Laser with Inductive Loading for Enhancing Discharge Uniformity, issued to Glen A. Griffith on Sept. 28, 1982, teaches a discharge-excited waveguide gas laser which utilizes a transverse rf excitation voltage at a frequency of at least about 30 MHz applied between elongated electrodes on opposite sides of the laser discharge chamber and which a plurality of shunt inductances coupled between the electrodes externally along the length of the chamber. These inductances provide a negative admittance which compensates for the variation in the phase angle of the transmission line reflection coefficient along the length of the laser discharge chamber. The variation in the magnitude of the standing wave voltage is reduced accordingly thereby improving the uniformity of the laser-exciting discharge.

U.S. Pat. No. 4,169,251, teaches Waveguide Gas Laser with High Freqency Transverse Discharge Excitation, issued to Katherine D. Laakman on Sept. 25, 1979, teaches waveguide lasers which are excited by means of a transverse discharge at rf frequencies generally in the vhf-uhf range, i.e., from about 30 MHz to about 3 GHz. These excitation frequencies are sufficiently high to ensure negligible interaction of discharge electrons with the discharge-establishing electrodes, thereby achieving superior discharge properties which result in a laser of improved performance and reduced size and complexity.

Recently there has been considerable interest in waveguide gas lasers wherein the laser light propagates through a hollow waveguide which also serves to confine the laser-exciting discharge. U.S. Pat. No. 3,772,611, entitled Waveguide Gas Laser Devices, issued to Peter William Smith on Nov. 13, 1973, teaches the basic excitation scheme which was used in most of the early waveguide lasers and which involves establishing a dc electric discharge longitudinally through the device between a pair of electrodes disposed near the respective ends of the laser waveguide. This type of discharge required relatively large dc excitation voltages of around 10 kv along with the necessary power supply and associated circuitry for generating voltages of this magnitude.

U.S. Pat. No. 3,772,611, also teaches the exciting of a ring-type waveguide laser from an rf source by means of a coil wound around the ring-shaped waveguide. Such a coil-type excitation arrangement not only is incapable of providing a highly uniform discharge, but it also affords poor coupling efficiency. Moreover, when more than a few coil turns are employed, the inductance of the coil becomes sufficiently large to limit the usable excitation frequencies below a few MHz.

In order to obtain a more uniform discharge with reduced excitation voltage, waveguide lasers have been developed wherein a pulsed discharge is established along a transverse waveguide dimension. U.S. Pat. No. 3,815,047, entitled Transversely-Excited Waveguide Gas Laser, issued to Peter William Smith and Obert Reeves Wood on June 4, 1974, teaches transversely-excited waveguide gas lasers which include a structure having a smooth base copper-anode and a plurality of cathode squares plated on a dielectric forming the wall opposite the copper-anode and a laser excitation source which is electrically coupled to the anode and cathode of the structure. The transversely-excited waveguide gas lasers also include an enclosure which encloses the structure and a plurality of gas inlets and outlets which maintain the laser gases at high total gas pressure within the structure. The transversely-excited waveguide gas lasers which have been operated in the quasi-continuous mode at pulse repetition rates as high as 40 kHz, as described in an article by Smith et al., entitled "Repetition-Rate and Quasi-CW Operation of a Waveguide Laser $CO_2$ $TE_{00}$ Laser", published in *Optics Communication*, Volume 16, Number 1, on January 1976, pages 50–53.

U.S. Pat. No. 4,103,255, entitled High Power, Compact Waveguide Gas Laser, issued Howard R. Schlossberg on July 25, 1978, teaches a high power, compact waveguide gas laser having located within a resonant cavity. The housing has a longitudinal chamber situated therein. The chamber is divided into a plurality of waveguides by a plurality of infrared transmitting partitions. During operation of the laser, the leakage of laser radiation between adjacent waveguides through the partitions causes coupling of the phases of the waveguide modes thereby producing a laser output of high power.

SUMMARY OF THE INVENTION

In view of the foregoing factors and conditions which are characteristic of the prior art it is the primary object of the present invention to provide an electrode configuration for use in combination with an elongated cylindrical chamber of a laser bore and electrode structure of a transverse excited gas laser which not only generates $TE_{0q}*$ Laguerre-Gaussian modes, but which also provides an azimuthally uniform discharge.

It is another object of the present invention to provide an electrode configuration for use in combination with an elongated cylindrical chamber of a laser bore and electrode structure of a transverse excited gas laser which allows for an increase in the cross-section of the elongated cylindrical chamber so that the transverse excited gas laser generates a higher output power per unit length.

In accordance with the present invention an embodiment of a configuration of electrodes in a transversely excited gas laser is desribed. The transversely excited gas laser includes an elongated cylindrical chamber with a laser gas confined therein, a pair of reflectors which reflect light energy from a discharge of the laser gas within the chamber so that the light energy travels longitudinally the length thereof, an rf generator which applies a voltage of alternating polarity between the electrodes at a frequency ranging from 10 Mhz to about 3 GHz to establish the laser gas discharge, a coupling circuit which matches the steady state reactive impedance of the chamber to the impedance of the rf generator and couples the rf generator to the electrodes. The configuration of the electrodes, each of which is formed from an electrically conductive material and is in the shape of a continuous helix, includes a first electrode and a second electrode each of which is disposed opposite to the other on the outer surface of the chamber in a first plane. The configuration of electrodes also includes a third electrode and a fourth electrode each of which is disposed opposite to the other on the outer surface of the chamber in a second plane which is orthogonal to the first plane. The phase correlation of the configuration of electrodes is such that the first electrode is in phase with the second electrode, the third electrode is in phase with the fourth electrode and the first electrode is 180° out of phase with the third electrode.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

In order to best understand the present invention it is necessary to refer to the following description of its preferred embodiment in conjunction with the accompanying drawing. The inventor has filed on July 30, 1982 an earlier patent application, entitled An Improved Elongated Chamber for Use in Combination with a Transversely Excited Gas Laser, which teaches an embodiment of a transversley excited gas laser which has a laser bore and electrode structure that includes an elongated cylindrical chamber having a cylindrical wall formed from a dielectric material, a first electrode plate and a second parallel plate, which are disposed parallel and oppositely to each other, a third electrode plate and a fourth parallel electrode plate, which are disposed parallel and oppositely to each other and which are also disposed orthogonally to the first and second electrode plates. An rf generator in conjunction with the electrode plates are used for transverely exciting a laser gas in order to establish the laser gas discharge therein. The rf generator is electrically coupled to the electrode plates in phase correlation wherein the first and second electrode plates are in phase and the third and fourth electrode plates are in phase with the first electrode plate being 180° out of phase with the third electrode plate.

Figure 1:
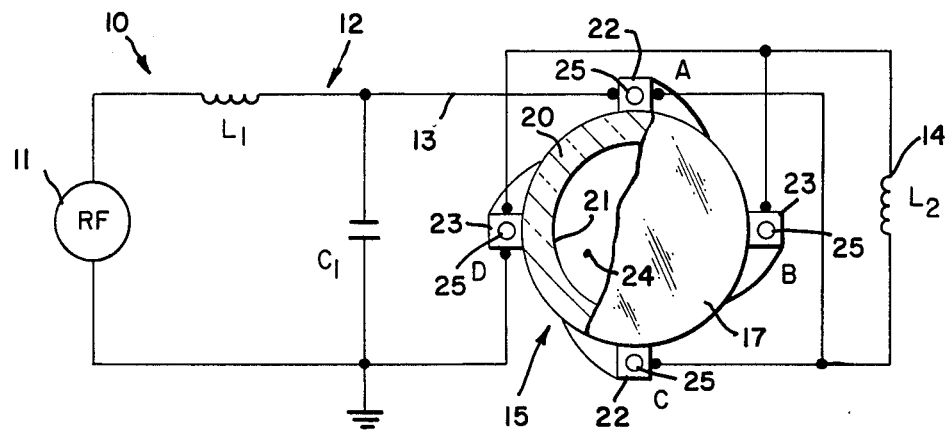
FIG. 1 is a schematic drawing of a first transversely excited gas laser and includes an end elevation view in partial cross-section of a laser bore and electrode structure having an electrode configuration each of the electrodes of which is in the shape of a continuous helix and which has been constructed in accordance with the principles of the first embodiment of the present invention.

Referring to FIG. 1 a first transversely excited gas laser 10 includes an rf generator 11 which has a first output and a second output, which is at ground and which is electrically coupled to the feedpoints B and D of the first transversely excited gas laser 10, a first coupling circuit 12 which includes a first inductor, $L_1$, which electrically couples the first output of the rf generator 11 to feedpoints A and C of the first transversely excited gas laser 10 and a coaxial connector 13 which electrically couples first output of the rf generator 11 to the first coupling circuit 12. The first coupling circuit 12 also includes a first capacitor, $C_1$, which electrically couples the first and second outputs of the rf generator 11. A second coupling circuit 14 includes a second inductor, $L_2$, which electrically couples feedpoints A and C to feedpoints B and D of a laser bore and electrode structure 15. The first transversely excited gas laser 10 also includes a pair of optical reflectors 17, which form a laser resonator.

Figure 2:
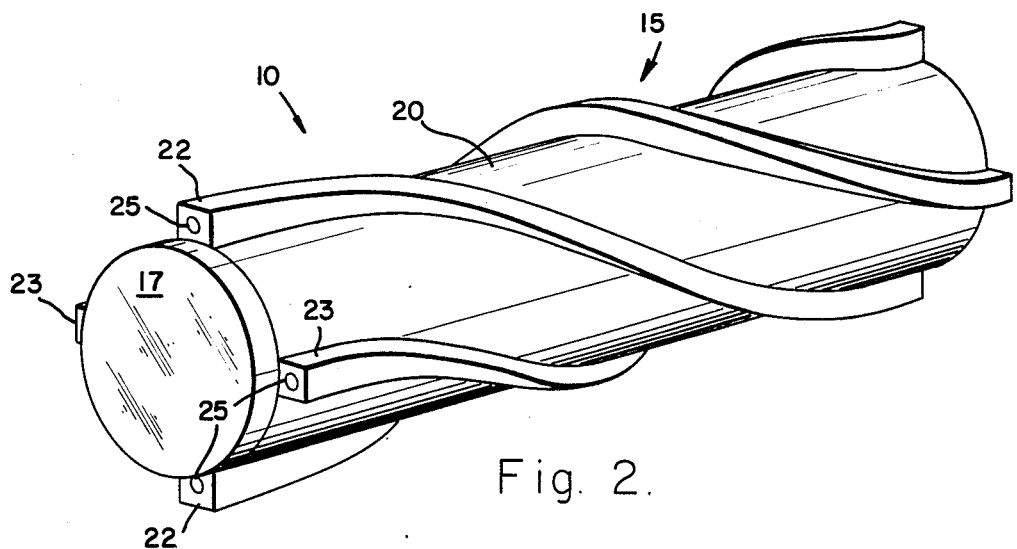
FIG. 2 is a perspective view of the laser bore and electrode structure of FIG. 1.

Referring to FIG. 2 in conjunction with FIG. 1 the configuration of the electrodes, each of which is formed from an electrically conductive material and is in the shape of a continuous helix, includes a first pair of electrode plates 22 which are disposed opposite to each other on the outer surface of the chamber 20 in a first plane and a second pair of electrode plates 23 which are disposed opposite to each other on the outer surface of the chamber 20 in a second plane which is orthogonal to the first plane. Each of electrode plates 22 and 23 has a cooling bore 25 through which a coolant can flow and is formed from an electrically conductive material, such as aluminum or copper. The phase correlation of the configuration of electrodes is such that each of the first pair of electrodes 22 is in phase with the other, each of the second pair of electrodes 23 is in phase with the other and the first and second pairs of electrodes plates 22 and 23 are 180° out of phase with each other. This transversely excited gas laser 10 will generate Laguerre-Gaussian $TE_{0q}^*$ modes. The laser discharge will occur around the outside of the cylindrical wall 21 of the chamber 20 and the electrodes 22 and 23 are symmetrically disposed whereby the laser discharge is "doughnut" shaped. The doughnut-shaped discharge in the chamber 20 promotes the oscillations of the $TE_{0q}^*$ modes.

Still referring to FIG. 2 in conjunction with FIG. 1 the chamber 20 which is of cross-sectional dimensions, not only in the range of 0.25 mm$^2$ to 7.5 mm$^2$, but also in the range greater that 7.5 mm$^2$, which is suitable for confining a laser gas discharge. The chamber 20 includes an internal wall 21 which are are formed from a dielectric material, such as BeO, $Al_2O_3$ or glass. The laser gas may be a standard $CO_2$ laser gas mixture including 65% He, 22% $N_2$, 13% $CO_2$ by mole fraction.

A sufficient amount of the laser gas 24 must be maintained in the chamber 20 in order to support the laser gas discharge. The laser gas 24 is at pressure ranging from 1 Torr to about 1000 Torr. The laser gas 24 is sealed in the chamber 20. In the preferred embodiment the pair of optical reflectors 17 are optically aligned with and mechanically coupled to the chamber 20 in order to seal the laser gas in the chamber 20.

The optical reflectors 17 reflect light energy from the laser gas discharge within the chamber 20 so that the light energy travels longitudinally the length of the chamber 20. In the preferred embodiment the optical reflectors 17 not only reflect, but also guide the light energy within the chamber 20 so that the light energy is optically independent of the internal wall 21 of the chamber 20.

In another embodiment the transversely excited gas laser 10 may also include a gas inlet and a gas outlet for letting the laser gas 24 into and out of the chamber 20 and a gas regulating device for regulating the pressure of the laser gas 24 in the chamber 20.

In still other embodiments the transversely excited gas laser 10 may include an enclosure in which the chamber 20 is disposed and the laser gas 24 is sealed. The transversely excited gas laser 10 may also include a gas inlet and a gas outlet for letting the laser gas 24 into and out of the enclosure and a gas regulating device for regulating the pressure of the laser gas 24 in the enclosure.

Figure 3:
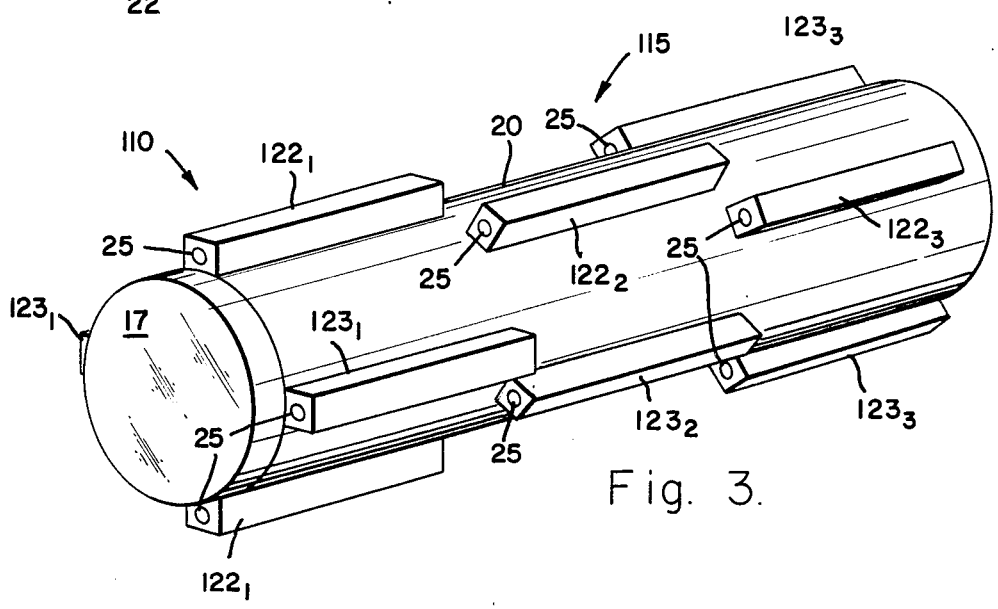
FIG. 3 is a perspective view of a laser bore and electrode structure of a second transversely excited gas laser having an electrode configuration each electrode of which is in the shape of a stepped helix and which has been constructed in accordance with the principles of the second embodiment of the present invention.

Referring to FIG. 3 a second transversely excited gas laser 110 includes a laser bore and electrode structure 115 the configuration of the electrodes, each of which is in the shape of a stepped helix, includes a first pair of three longitudinally disposed electrode plate elements $122_1$, $122_2$ and $122_3$ which are disposed opposite to each other on the outer surface of the chamber 20 in a first plane and a second pair of three longitudinally disposed electrode plate elements $123_1$, $123_2$ and $123_3$ which are disposed opposite to each other on the outer surface of the chamber 20 in a second plane which is orthogonal to the first plane. The phase correlation of the configuration of electrodes is such that each of the first pair of plurality of electrodes $122_1$, $122_2$ and $122_3$ is in phase with the other, each of the second pair of plurality of electrode plate elements $123_1$, $123_2$ and $123_3$ is in phase with the other and the first and second pairs of electrodes $122_1$, $122_2$, $122_3$, $123_1$, $123_2$ and $123_3$ are 180° out of phase with each other.

Figure 4:
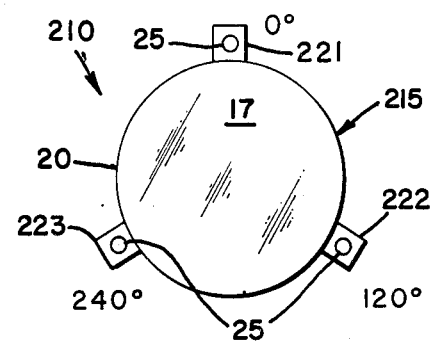
FIG. 4 is an end elevational view of a laser bore and electrode structure of a third transversely excited gas laser having an electrode configuration which has three elongated rectangular electrodes which are disposed longitudinally and which are spaced 120 degrees apart from each other and which has been constructed in accordance with the principles of the third embodiment of the present invention.

Referring to FIG. 4 a third transversely excited gas laser 210 includes a laser bore and electrode structure 215 has a configuration of the electrodes which a first electrode plate 221 which is disposed to the other on the outer surface of the chamber 20 in a first plane with the center of the chamber 20, a second electrode plate 222 which is disposed on the outer surface of the chamber 20 in a second plane which is intersects the first plane at an angle of 120° at the center of the chamber 20 and a third electrode plate 223 which is disposed on the outer surface of the chamber 20 in a third plane which intersects the second plane at an angle of 120° at the center of the chamber 20. The phase correlation of the configuration of electrodes is such that the first electrode plate 221 is in 120° out of phase with the second electrode plate 222 and the second electrode plate 222 is 120° out of phase with the second electrode plate 223.

Figure 5:
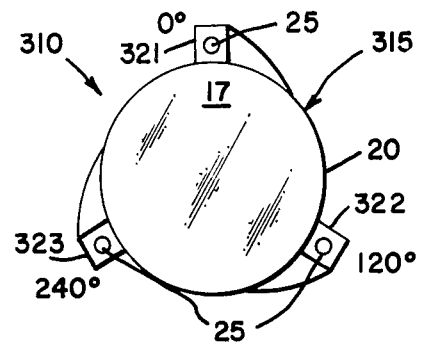
FIG. 5 is an end elevational view of a laser bore and electrode structure of a fourth transversely excited gas laser having an electrode configuration which has three electrodes, each of which is in the shape of a continuous helix and which are spaced 120 degrees apart from each other, and which has been constructed in accordance with the principles of the fourth embodiment of the present invention.

Referring to FIG. 5 a fourth transversely excited gas laser 310 includes a laser bore and electrode structure 315 has a configuration of the electrodes, each of which is in the shape of a continuous helix, includes a first longitudinally disposed electrode plate 321, which is disposed on the outer surface of the chamber 20 in a first plane with the center of the chamber 20, a second electrode plate 322 which is disposed on the outer surface of the chamber 20 in a second plane which is intersects the first plane at an angle of 120° at the center of the chamber 20 and a third electrode plate 323 which is disposed on the outer surface of the chamber 20 in a third plane which intersects the second plane at an angle of 120° at the center of the chamber 20. The phase correlation of the configuration of electrodes is such that the first electrode 321 is 120° out of phase with the second electrode plate 322 and the second electrode plate 322 is 120° out of phase with the third electrode plate 323. In a similar embodiment the configuration of the electrodes, each of which is in the shape of a stepped helix, may includes a first pair of three longitudinally disposed electrode plate elements which are disposed on the outer surface of the chamber 20 in the first plane, a second pair of three longitudinally disposed electrode plate elements which are disposed on the outer surface of the chamber 20 in the second plane and a third pair of three longitudinally disposed electrode plate elements which are disposed on the outer surface of the chamber 20 in the third plane.

Figure 6:
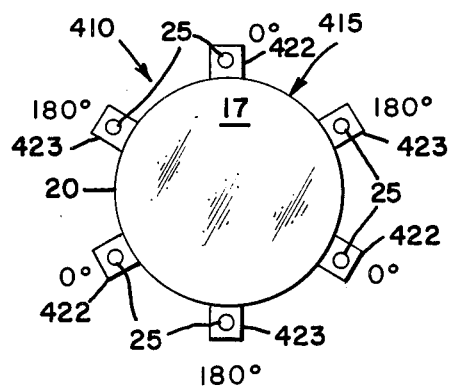
FIG. 6 is an end elevational view of a laser bore and electrode structure of a fifth transversely excited gas laser having an electrode configuration which has a plurality, N (N=3), of pairs of elongated rectangular electrodes which are disposed longitudinally and which are spaced 360/2N (60) degrees apart from each other and which has been constructed in accordance with the principles of the fifth embodiment of the present invention.

Referring to FIG. 6 a fifth transversely excited gas laser 410 includes a laser bore and electrode structure 415 has a configuration of the electrodes which a first pair electrode plates 422 and 423 which are oppositely disposed to each other on the outer surface of the chamber 20 in a first plane with the center of the chamber 20, a second pair of electrode plates 422 and 423 which are oppositely disposed on the outer surface of the chamber 20 in a second plane which is intersects the first plane at an angle of 60° at the center of the chamber 20 and a third pair of electrode plates 422 and 423 which are oppositely disposed to each other on the outer surface of the chamber 20 in a third plane which intersects the second plane at an angle of 60° at the center of the chamber 20. The phase correlation of the configuration of electrodes is such that electrode plates 422 of a first set of each pair of electrode plates 422 and 423 are in phase with each other and electrode plates 422 of a second set of each pair of electrode plates 423 are in phase with each other, but are 180° out of phase with the first set of electrode plates 422.

Figure 7:
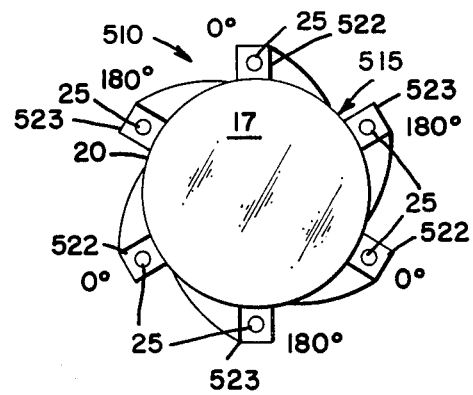
FIG. 7 is an elevational view of a laser bore and electrode structure having an electrode configuration of a sixth transversely excited gas laser which has a plurality, N (N=3), of pairs of electrodes, each of which is in the shape of a continuous helix and which are spaced 360/2N (60) degrees apart from each other, and which has been constructed in accordance with the principles of the sixth embodiment of the present invention.

Referring to FIG. 7 a sixth transversely excited gas laser 510 includes a laser bore and electrode structure 515 has a configuration of the electrodes, each of which is in the shape of a continuous helix, includes a first pair of electrode plates 522 and 523, which are oppositely disposed to each other on the outer surface of the chamber 20 in a first plane with the center of the chamber 20, a second pair of electrode plate 522 and 523 which are oppositely disposed to each other on the outer surface of the chamber 20 in a second plane which is intersects the first plane at an angle of 60° at the center of the chamber 20 and a third pair of electrode plates 522 and 523 which are oppositely disposed to each other on the outer surface of the chamber 20 in a third plane which intersects the second plane at an angle of 60° at the center of the chamber 20. The phase correlation of the configuration of electrodes is such that electrode plates 522 of a first set of each pair of electrode plates 522 and 523 are in phase with each other and electrode plates 522 of a second set of each pair of electrode plates 523 are in phase with each other, but are 180 out of phase with the first set of electrode plates 522. In a similar embodiment the configuration of the electrodes, each of which is in the shape of a stepped helix, may includes a first pair of sets of three longitudinally disposed electrode plate elements which are oppositely disposed to each on the outer surface of the chamber 20 in the first plane, a second pair of sets of three longitudinally disposed electrode plate elements which are oppositely disposed to each on the outer surface of the chamber 20 in the second plane and a third pair of sets of three longitudinally disposed electrode plate elements which are oppositely disposed to each on the outer surface of the chamber 20 in the third plane.

From the foregoing it can be seen that configurations for electrodes for transversely excited gas lasers have been described. It should be noted that distance of and between the figures are not to be considered significant.

Accordingly it is intended that the foregoing disclosure and showing made in the drawing shall be considered only as an illustration of the principles of the present invention.

What is claimed is:

1. A configuration of electrode means for use in a transversely excited gas laser which includes:
   a. an elongated cylindrical chamber of cross-sectional dimensions suitable for confining a laser gas discharge;
   b. a laser gas disposed in said chamber;
   c. first and second reflecting means for reflecting light energy from said laser gas discharge within said chamber so that said light energy travels longitudinally the length of said chamber;
   d. energy means for applying a voltage of alternating polarity between said electrode means at a frequency ranging from 10 Mhz to about 3 GHz to establish said laser gas discharge in said laser gas; and
   e. coupling means for matching the steady state reactive impedance of said chamber to the impedance of said energy means and for coupling said energy means to said electrode means, said configuration of electrode means comprising:
      a. a first electrode plate and a second electrode plate each of which is formed from an electrically conductive material and is disposed opposite to the other on the outer surface of said chamber in a first plane; and
      b. a third electrode plate and a fourth electrode plate, each of which is formed from an electrically conductive material and is disposed opposite to the other on the outer surface of said chamber in a second plane which is orthogonal to said first plane whereby the phase correlation of said improved configuration of electrode means is such that said first electrode plate is in phase with said second electrode plate, said third electrode plate is in phase with said fourth electrode plate and said first electrode plate has an opposite polarity than said third electrode plate.

2. A configuration of electrode means according to claim 1 wherein each said first, second, third and fourth electrode plates is in the shape of a continuous helix.

3. A configuration of electrode means according to claim 1 wherein each said first, second, third and fourth electrode plates is in the shape of a stepped helix and is formed by a plurality of longitudinaly disposed electrode plate elements.

4. A configuration of electrode means for use in a transversely excited gas laser which includes:
   a. an elongated cylindrical chamber of cross-sectional dimensions suitable for confining a laser gas discharge;
   b. a laser gas disposed in said chamber;
   c. first and second reflecting means for reflecting light energy from said laser gas discharge within said chamber so that said light energy travels longitudinally the length of said chamber;
   d. energy means for applying a voltage of alternating polarity between said electrode means at a frequency ranging from 10 Mhz to about 3 GHz to establish said laser gas discharge in said laser gas; and
   e. coupling means for matching the steady state reactive impedance of said chamber to the impedance of said energy means and for coupling said energy means to said electrode means, said configuration of said electrode means comprising:
      a. a first electrode plate which is formed from an electrically conductive material and is disposed to the other on the outer surface of said chamber in a first plane with the center of said chamber;
      b. a second electrode plate which is formed from an electrically conductive material and is disposed on the outer surface of said chamber in a second plane which is intersects said first plane at an angle of 120° at the center of said chamber; and
      c. a third electrode plate which is formed from an electrically conductive material and is disposed on the outer surface of said chamber in a third plane which intersects said second plane at an angle of 120° at the center of said chamber whereby the phase correlation of said configuration of electrode means is such that said first electrode plate is in 120° out of phase with said second electrode plate and said second electrode plate has a different polarity than said third electrode plate.

5. A configuration of electrode means according to claim 4 wherein each said first, second, and third electrode plates is in the shape of a continuous helix.

6. A configuration of electrode means according to claim 4 wherein each said first, second, and third electrode plates is in the shape of a stepped helix and is formed by a plurality of longitudinaly disposed electrode plate elements.

7. An improved configuration of electrode means for use in a transversely excited gas laser which includes:
   a. an elongated cylindrical chamber of cross-sectional dimensions suitable for confining a laser gas discharge;
   b. a laser gas disposed in said chamber;
   c. first and second reflecting means for reflecting light energy from said laser gas discharge within said chamber so that said light energy travels longitudinally the length of said chamber;
   d. energy means for applying a voltage of alternating polarity between said electrode means at a frequency ranging from 10 Mhz to about 3 GHz to establish said laser gas discharge in said laser gas; and
   e. coupling means for matching the steady state reactive impedance of said chamber to the impedance of said energy means and for coupling said energy means to said electrode means, said configuration of said electrode means comprising:
      a. a first electrode plate and a second electrode plate each of which is formed from an electrically conductive material and is disposed opposite to the other on the outer surface of said chamber in a first plane which intersects the center of said chamber;
      b. a third electrode plate and a fourth electrode plate, each of which is formed from an electrically conductive material and is disposed opposite to the other on the outer surface of said chamber in a second plane which intersects said first plane at an angle of 60° at the center of said chamber; and
      c. a fifth electrode plate and a sixth electrode plate, each of which is formed from an electrically conductive material and is disposed opposite to the other on the outer surface of said chamber in a third plane which intersects said second plane at an angle of 60° at the center of said chamber whereby the phase correlation of said configuration of electrode means is such that said first, third, and fifth electrode plates are in phase with each other and said second, fourth and sixth electrode plates are in phase with each other and said first electrode plate has an opposite polarity than said second electrode plate.

8. A configuration of electrode means according to claim 7 wherein each said first, second, third, fourth, fifth and sixth electrode plates is in the shape of a continuous helix.

9. A configuration of electrode means according to claim 7 wherein each said first, second, third, fourth, fifth and sixth electrode plates is in the shape of a stepped helix and is formed by a plurality of longitudinaly disposed electrode elements.

10. An improved configuration of electrode means for use in a transversely excited gas laser which includes:
   a. an elongated cylindrical chamber of cross-sectional dimensions suitable for confining a laser gas discharge;
   b. a laser gas disposed in said chamber;
   c. first and second reflecting means for reflecting light energy from said laser gas discharge within said chamber so that said light energy travels longitudinally the length of said chamber;
   d. energy means for applying a voltage of alternating polarity between said electrode means at a frequency ranging from 10 Mhz to about 3 GHz to establish said laser gas discharge in said laser gas; and
   e. coupling means for matching the steady state reactive impedance of said chamber to the impedance of said energy means and for coupling said energy means to said electrode means, said configuration of said electrode means comprising a first plurality, N, of electrode plates and a second plurality, N, of electrode plates each of which is formed from an electrically conductive material and is disposed opposite to the other on the outer surface of said chamber in one of a plurality of planes which intersect the center of said chamber with each of said planes being disposed at angle of 360°/2N to the adjacent planes whereby the phase correlation of said configuration of electrode means is such that said all of said first plurality of electrode plates are in phase with each other and all of said second plurality of electrode plates are in phase with each other and each of said first plurality of electrode plates has an opposite polarity than each of said second plurality of electrode plates.

11. A configuration of electrode means for use in a transversely excited gas laser which includes:
   a. an elongated cylindrical chamber of cross-sectional dimensions suitable for confining a laser gas discharge;
   b. a laser gas disposed in said chamber;
   c. first and second reflecting means for reflecting light energy from said laser gas discharge within said chamber so that said light energy travels longitudinally the length of said chamber;
   d. energy means for applying a voltage of alternating polarity between said electrode means at a frequency ranging from 10 Mhz to about 3 GHz to establish said laser gas discharge in said laser gas; and
   e. coupling means for matching the steady state reactive impedance of said chamber to the impedance of said energy means and for coupling said energy means to said electrode means, said configuration of said electrode means comprising:
      a. a plurality, N, of electrode plates each of which is formed from an electrically conductive material and is disposed to the other on the outer surface of said chamber in one of a plurality of planes which intersect the center of said chamber with each of said plane being disposed at angle of 360°/N to the adjacent planes whereby the phase correlation of said configuration of electrode means is such that each of said plurality of electrode plates has an opposite polarity than each of the adjacent electrode plates.

* * * * *